United States Patent [19]

Hasquenoph et al.

[11] 4,168,047
[45] Sep. 18, 1979

[54] AUTOMATIC LOAD CARRIER AND JETTISONING SYSTEM WITH BUILT-IN HOISTING MEANS

[75] Inventors: Jean H. Hasquenoph, Lagny-sur-Marne; Pierre F. Coutin, Paris, both of France

[73] Assignee: R. Alkan & Cie, Valenton, France

[21] Appl. No.: 866,899

[22] Filed: Jan. 4, 1978

Related U.S. Application Data

[63] Continuation of Ser. No. 701,916, Jul. 1, 1976, abandoned.

[30] Foreign Application Priority Data

Jul. 3, 1975 [FR] France .................................. 75 20957

[51] Int. Cl.² .............................................. B64D 1/02
[52] U.S. Cl. ............................... 244/137 R; 89/1.5 R; 294/83 AA
[58] Field of Search ................... 244/137 R; 89/1.5 R, 89/1.5 C, 1.5 F, 1.5 G; 294/83 R, 83 AA, 83 AE; 85/5 B; 403/316, 317

[56] References Cited

U.S. PATENT DOCUMENTS

| 2,255,695 | 9/1941 | Bull | 294/83 AA |
| 2,693,980 | 11/1954 | Heidman | 294/83 AA |
| 2,734,705 | 2/1956 | Robertson | 244/137 R |
| 2,889,746 | 6/1959 | Glassman et al. | 244/137 R X |
| 3,799,478 | 3/1974 | Costes et al. | 89/1.5 F X |

FOREIGN PATENT DOCUMENTS

| 862893 | 3/1961 | United Kingdom | 244/137 R |
| 956020 | 4/1964 | United Kingdom | 244/137 R |

Primary Examiner—Barry L. Kelmachter
Attorney, Agent, or Firm—William Anthony Drucker

[57] ABSTRACT

This hoisting device for loads to be carried under aircraft is incorporated partially or completely in a load carrier system without requiring any lateral access, the connection between the hoisting device and the load being eliminated automatically once the load is properly anchored to the carrier system. The device comprises one or two ropes, as the case may be, and comprises an anchoring member rigid with the load and formed with an internal groove engageable by a set of balls carried by a socket in which an end piece crimped to the rope end is adapted to travel axially through a limited extent. Slackening the rope will free the load which is then retained by the carrier system.

3 Claims, 6 Drawing Figures

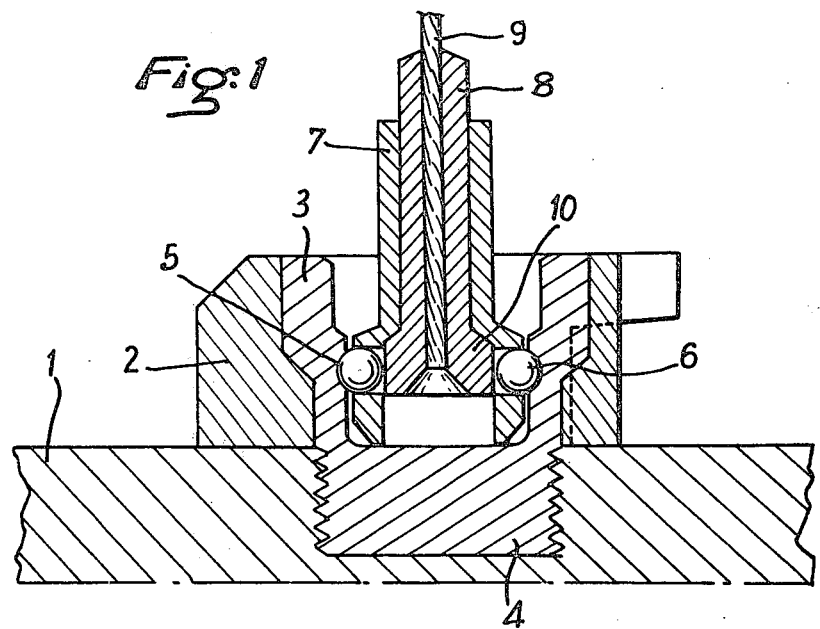
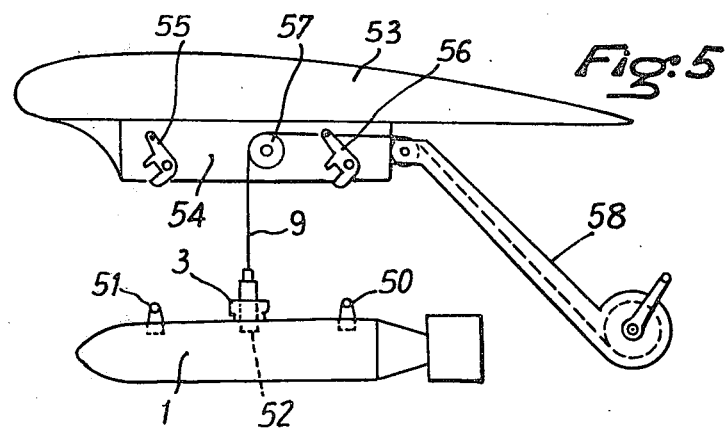
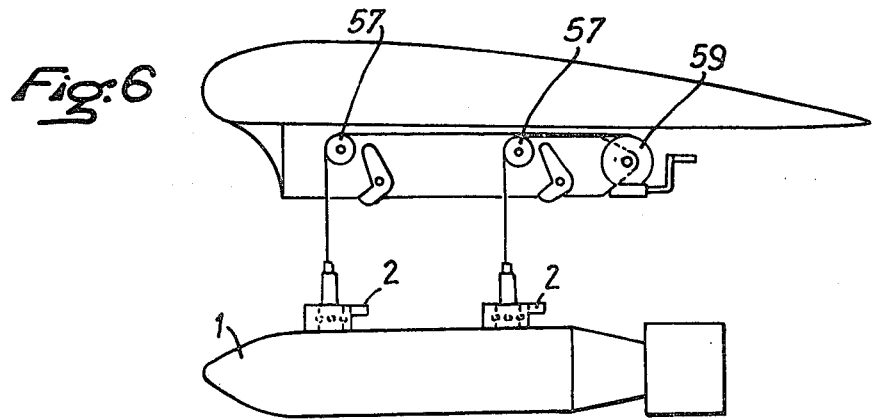

AUTOMATIC LOAD CARRIER AND JETTISONING SYSTEM WITH BUILT-IN HOISTING MEANS

This is a continuation of Ser. No. 701,916 filed 1st July 1976 now abandoned.

BACKGROUND OF THE INVENTION

1. Field of the Invention

The invention relates to devices for hoisting loads on aircrafts and has more specific reference to a device of this type incorporated in the carrier and automatic jettisoning system of the aircraft.

2. Description of the Prior Art

Various means are used for positioning loads to be carried by the lower structure of an aircraft. Thus, forklift trucks or winches are currently used for this purpose. As a rule, winches are operated by pairs and suspended on each side of the carrier device. In this case, a strap is passed around the load and the strap ends are attached to the corresponding ends of the winch rope. Of course, the two winches must be operated simultaneously and a relatively free access to both sides of the load and of the carrier system is necesary. The assembly comprising the winches, the ropes, the strap and the winch anchoring device is detachable and available as a rule at any military base. In certain cases especially in the case of very heavy aircraft, the winch system is incorporated in the carrier system and thus constantly available.

SUMMARY OF THE INVENTION

The present invention relates to a hoisting device incorporated partially or completely in the carrier system without requiring any lateral access, the connection between the hoisting device and the load being eliminated automatically when the load is properly anchored to the carrier system. The device of this invention comprises one or two ropes or cables, as the case may be and as will be explained presently. The ropes extend along the vertical median plane of the carrier device and pass if necessary over one or a plurality of pulleys, according to an arrangement already known per se; furthermore, these ropes are connected to a winch, of the detachable or fixed type, and have their free ends attached to the load to be hoisted, as explained hereinafter.

As a rule, the load comprises tapped holes for securing the anchoring members such as rings or bridge members as disclosed in the U.S. Pat. Nos. 3,840,201 and 3,954,233. For the purposes of the present invention, said tapped holes are utilized for securing to the load hollow members of special configuration in which the rope ends are adapted to be anchored when a tractive effort is exerted on said ropes, this coupling being suppressed automatically when the application of said tractive effort is discontinued. As a result, when the load has been hoisted home and locked in relation to the carrier system, releasing the rope tension permits of jettisoning this load notwithstanding the presence of the hoisting device to which it is no more connected. If it is desired or necessary to lay the thus hoisted and locked load on the ground, it is only necessary to pull the rope to restore the coupling so that the load again suspended from the rope can be lowered to ground level. The relative movement of the locking members is constantly controlled and in addition any faulty manoeuver is definitely prevented by the provision of a special mechanism.

BRIEF DESCRIPTION OF THE DRAWING

FIG. 1 is a vertical section showing the rope coupling device according to this invention in its operative position;

FIG. 5 illustrates the load during the hoisting thereof by means of a central tapped hole; and FIG. 6 illustrates the load during the hoisting thereof by means of two end tapped holes equipped with bridge members substituted for the common suspension rings.

DESCRIPTION OF THE PREFERRED EMBODIMENTS

Figure 2:
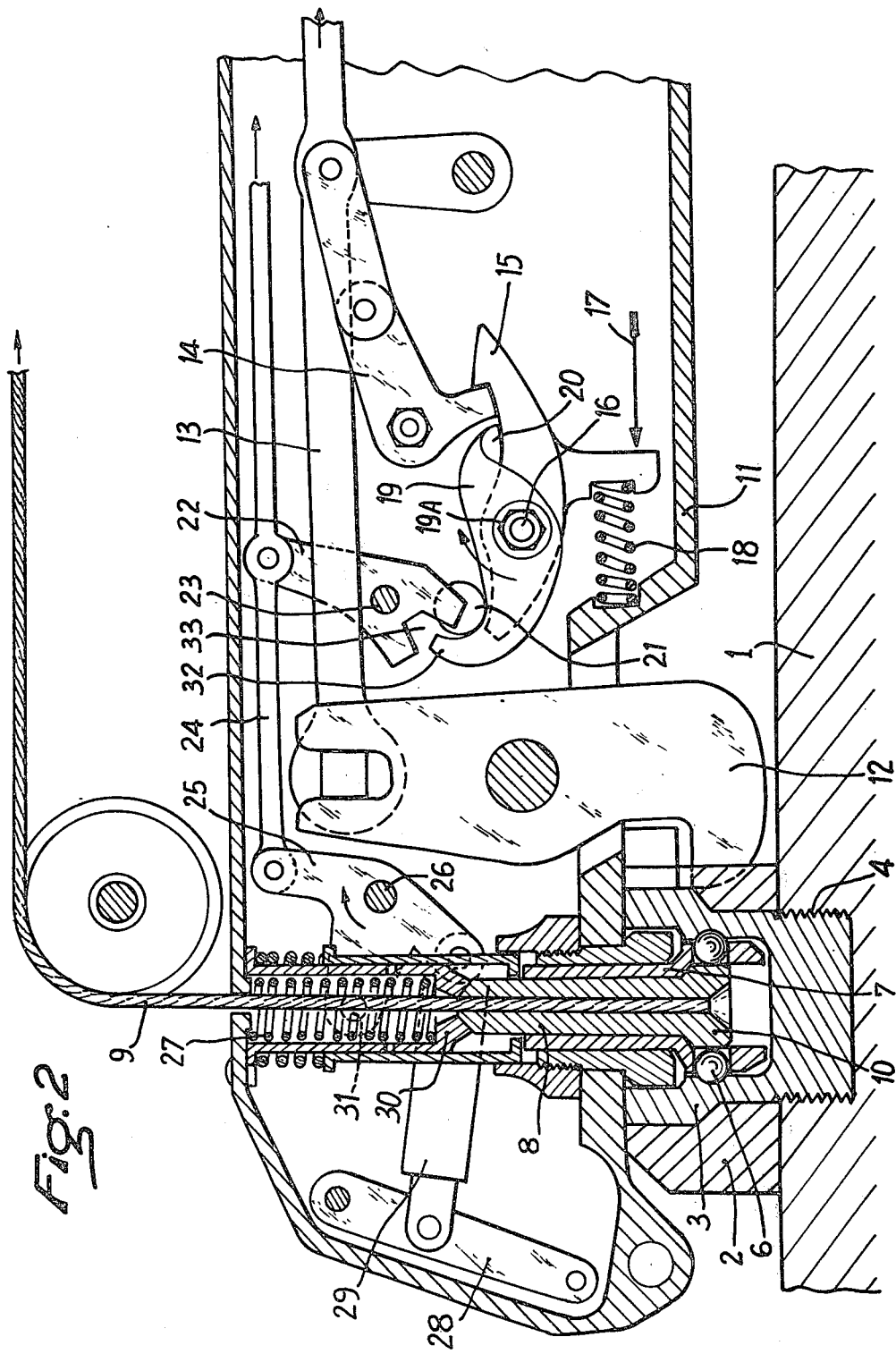
FIG. 2 illustrates also in vertical section the same coupling device at the end of a hoisting operation (with the rope tight), this device being associated with the safety carrier mechanism.

Referring first to FIG. 1, the reference numeral 1 designates the load to be hoisted, 2 designating one of the bridge-type suspension members or keepers substituted for the conventional ring member, while 3 is a main component of the device of this invention, which has a particular configuration and comprises essentially a screw-threaded base 4 engaging a matching tapped hole formed in the load 1, and an upper portion which, when the screw-threaded base 4 is tightened home, presses the part 2 against the top surface of the load and locks this part in relation to the load 1. The part 3 is a body of revolution and has formed in a central cavity a circular groove 5 in which a plurality of balls 6 are adapted to penetrate. These balls 6 are normally housed in radial holes formed in a lower expanded portion of a socket 7 fitted around a cylindrical member 8 crimped to the end portion of a hoisting rope 9 and formed at its bottom with a circular swell 10. This member 8 is adapted to slide in the socket 7 so that its swell 10 can either push the balls 6 outwardly in their holes for engaging the groove 5, or permit the inward movement of said balls 6, to disconnect the rope 9 from the load 1.

It is clear that the swell 10 is caused to push the balls 6 outwards when the hoisting rope 9 is tight or pulled upwards, so that the balls 6 cannot escape from the groove 5 and the rope traction is transmitted from member 8 to the part 3 screwed in the load 1 through its base 4. Conversely, if the rope is slackened, the member 8 can move downwards in the socket 7 and the balls 6 do not register with the swell 10, so that the load 1 is released.

In FIG. 2 the rope anchoring device is shown not only in hoisting relationship to the load 1, as in the case of FIG. 1, but also in its uppermost position in which the bridge-type suspension member or keeper 2 engages the carrier device designated diagrammatically at 11; it is thus obvious that the load is also supported to another suspension point (not shown) similar to the one illustrated in the Figure. For additional safety, the relative position of the suspension members is reproduced in the carrier mechanism in order to prevent any faulty manoeuver. This mechanism, of known type, is not shown fully in FIG. 2, illustrating only one of its two hooks 12 engaging the bridge member 2, and its rod 13 operatively connecting the hook 12 illustrated to the other homologue hook (not shown) located on the right side of the visible portion of FIG. 2.

When hoisting the load, the bridge-shaped members 2 rigid therewith firstly engage and clear the noses of the hooks 12 moved back to their operative position by the carrier mechanism comprising a detent device incorporating a two-armed lever 14 connected to the aforesaid rod 13 via an effort reducing toggle operating according to a well-known principle. The reference numeral 15 designates the detent heel adapted to retain the lever 14 and pivoted to a pin 16, this detent heel 15 being adapted to be released through an operator controlled linkage acting in the direction of the arrow 17 against the force of a return spring 18. Also pivoted to said pin 16 is a member 19 rigid with a hexagonal head 19A adapted to be actuated for manually releasing the load, when necessary.

Actuating said hexagonal head 19A causes the detent heel 15 to be tilted by the pressure exerted through the nose 20 of member 19. A hole 21 is formed through the wall of the casing of the carrier mechanism for receiving a transverse rod (not shown), this hole being however partially closed, in the condition shown in FIG. 2, by a member 22 pivoting about a fixed pin 23 and also pivotally mounted to the rod 24 for actuation thereby, said rod 24 being controlled in turn by a bell-crank lever 25 fulcrumed to a pin 26 and responsive to the level attained by the member 8 of the rope coupling device against the force of a spring 27, whereby the rod 24 and member 22 are controlled by the level attained by the hoisting device 7, 8.

The same bell crank lever 25 is operatively connected to the lever 28 controlling the load wedging blocks through the medium of spring means 29 similar to the means disclosed in the U.S. Pat. No. 3,954,233 mentioned hereinabove.

In the example illustrated the lever 25 is connected to said member 8 via a member 30 upset on said member 8 while compressing the spring 27. For this purpose, the aforesaid member 30 comprises a lateral stud 31 engaging a slot formed in said bell-crank lever 25.

Figure 3:
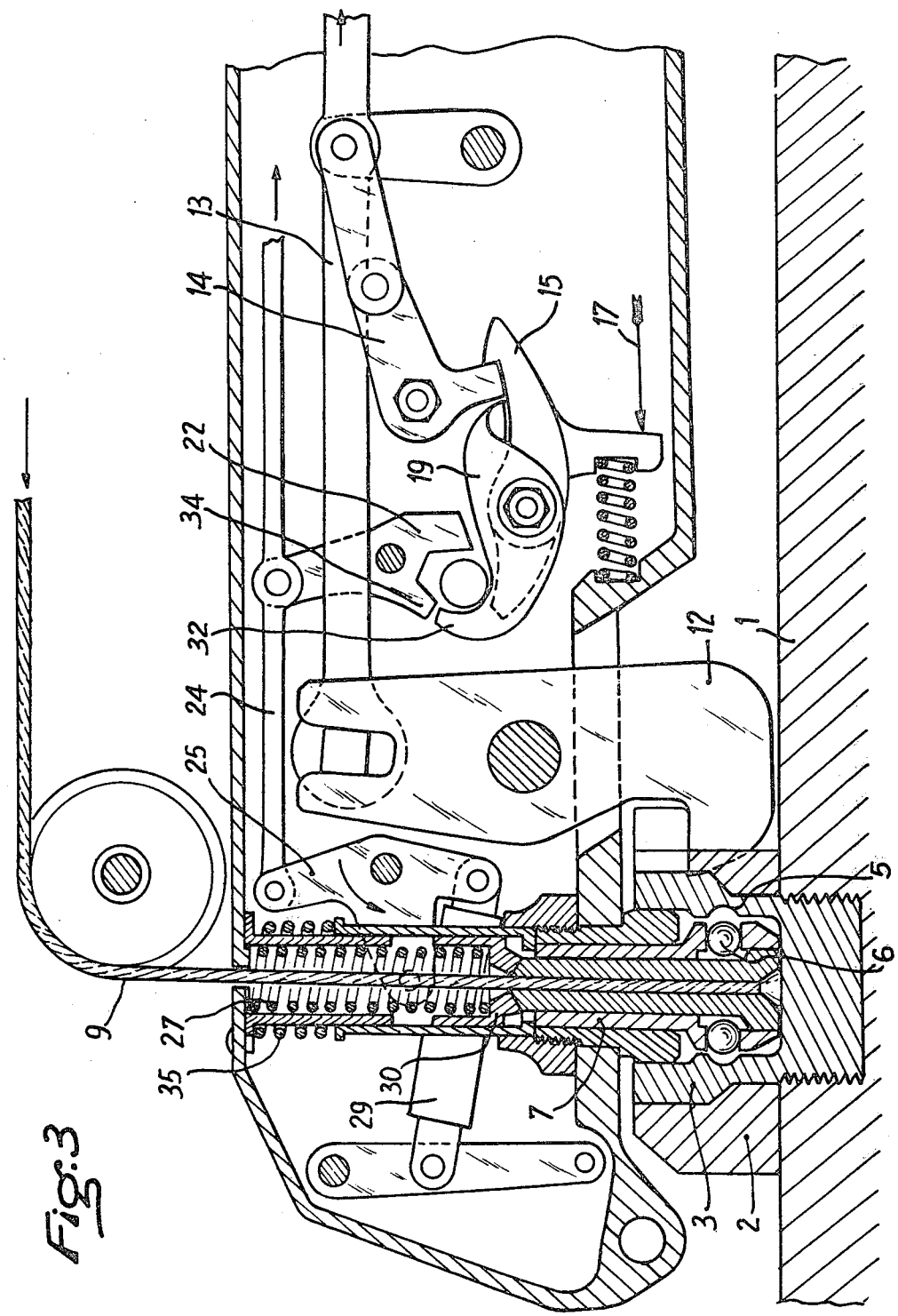
FIG. 3 illustrates the device after completing the hoisting operation and releasing the rope tension, so that the load is ready for jettisoning.

The opposite end 32 of the manual release control member 19 is adapted to engage an end notch 33 formed in said member 22 when the hoisting device is in its uppermost position, while in a slightly lower position of said hoisting device (as shown in FIG. 3) the aforesaid end 32 registers with an abutment portion 34 of member 22, the latter being then positioned to free the hole 21.

Now the operation of the above-described assembly will be described with reference to FIGS. 2 and 3. When the load has been hoisted home, the member 30 actuates the bell-crank lever 25 to bring the rod 24 to the position shown in FIG. 2, as already explained, with the result that on the one hand the wedging blocks are released through the lever 28 to permit the maximum hoisting movement and on the other hand the member 22 is brought to the position permitting the manual release of the load by actuating the hexagonal head 19A while the end 32 of member 19 engages the notch of member 22. During the actuation, the nose 20 drives the detent heel 15 against the resitance of spring 18 while permitting the backward movement of hook 12, whereby the load 1 is no more locked but remains suspended from the ropes 9; so that the load can be laid down without any risk of untimely release.

If, in contrast thereto, when the load has been hoisted to its maximum height as illustrated in FIG. 2 the rope 4 is slackened, the load will be supported as shown in FIG. 3 by the hooks 12 while permitting the expansion of spring 27 and the downward movement of member 8 of which the swell 10 will free the balls 6 so that they can escape from the circular groove 5. Moreover, the spring 35 urges the socket 7 to its lower position. The load is no more retained by the hook 12 and can be jettisoned during a flight by exerting one of the conventional actions upon the detent heel 15 in the direction of the arrow 17.

On the ground, the position assumed by said member 22 as a consequence of the tilting of bell-crank lever 25 in the direction of the arrow in FIG. 3 permits of introducing a detachable safety rod through the hole 21 to prevent through the abutment member 34 any manual release that would drop the load. Moreover, as the load is carried by the hook 12, the wedging blocks are released simultaneously and urged in the wedging direction by the spring-loaded device 29 restored to its operative position by the bell-crank lever 25.

Figure 4:
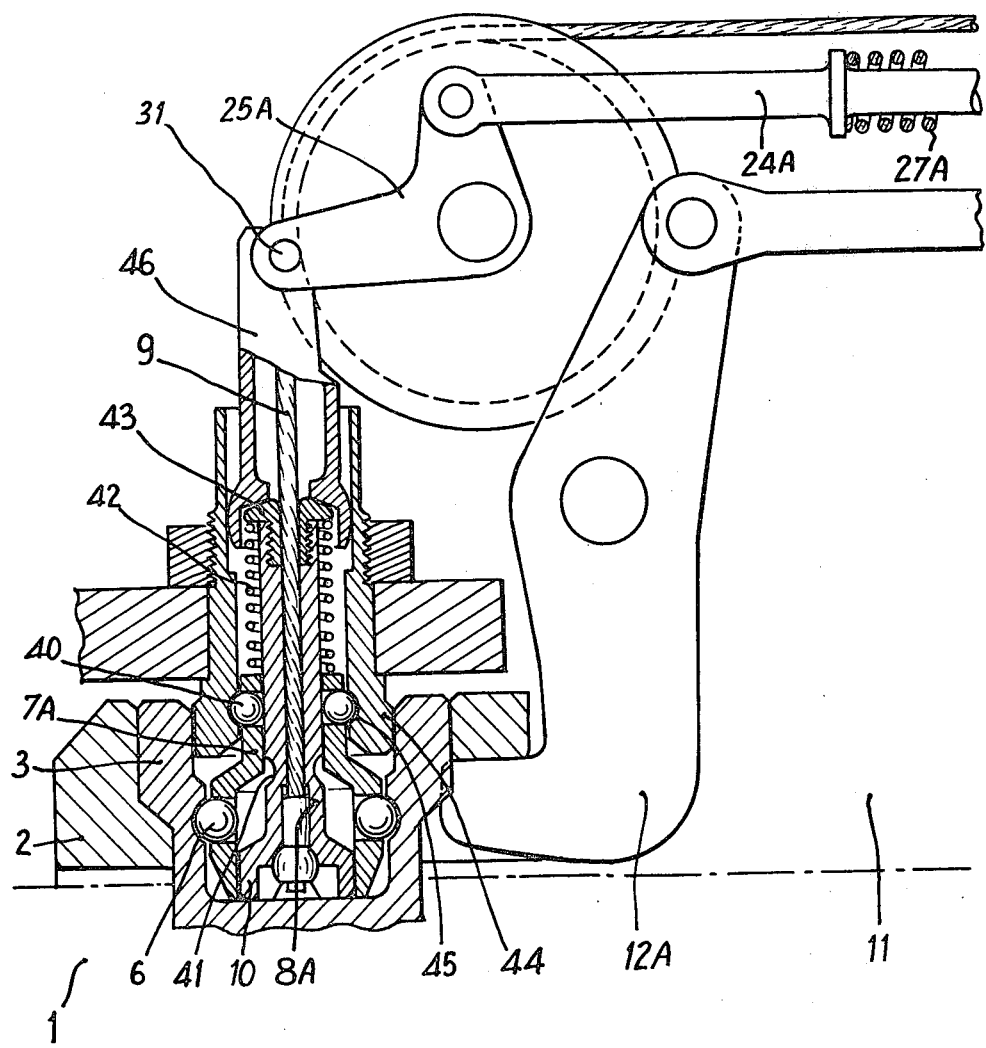
FIG. 4 illustrates a modified form of embodiment of the rope coupling device incorporating additional locking means.

In FIG. 4 the component elements similar to those illustrated in FIG. 1 to 3 are designated by the same reference numerals, and the equivalent elements or those having similar or comparable functions are designated by the same reference numerals indexed by the letter A. Thus, socket 7A comprises a second row of balls 40 adapted to engage an external annular groove 41 formed in a member 8A, A spring 42 engages with one end the upper end of said socket 7A and with the opposite or upper end the member 8A with the interposition of a screw 43. A guide member 44 rigid with the structure of the carrier and jettisoning device 11 is formed with an internal groove 45 and has slidably fitted therein a tubular member 46 coupled via a lateral stud 31 to the bell-crank lever 25A fulcrumed on the control rod 24A responsive to the force of a spring 27A.

The modified device illustrated in FIG. 4 operates as follows. During the hoisting operation, the tight rope 9 brings the circular swell 10 of member 8A level with the balls 6 as in the preceding case, with the assistance of spring 42. At the same time, the groove 41 of member 8A registers with the second row of balls 40 of member 7A, so that these balls can move unwardly without interfering with the introduction of the hoisting device into the guide member 44 and with the complete hoisting of the load. As in the preceding case, the member 8A pushes the intermediate member 46 upwards while tilting the bell-crank lever 25A against the force of spring 27A, and the rod 24A controls the safety movements through members similar to those of FIGS. 2 and 3 but not shown in FIG. 4 in order to simplify the drawing. Similarly, the bell-crank lever 25A controls the backward movement or the movement to their operative position of the wedging blocks (not shown) through connecting means (not shown), as mentioned hereinabove with reference to FIGS. 2 and 3. When the hoisting rope 9 is slackened, the load bears on the hook 12A, spring 27A moves the bell-crank lever 25A to the position illustrated and member 8A to the bottom of member 3. Thus, the swell 10 is not level with the balls 6 so that these balls have the possibility of moving inwardly while on the other hand the balls 40 are engaged in the groove 45 of fixed guide member 44 and retained in the cylindrical portion of member 8A of which the groove 41 is shifted downwards.

The essential advantage characterising the arrangement is that during the jettisoning of load 1 the complete hoisting device remains coupled to the carrier and safety mechanism 11 without allowing any relative movement to take place therebetween and cause an untimely re-engagement. Besides, the spring 42 facilitates the connection on the ground between the hoisting device and the load by maintaining said device in its locked position with respect to part 3, i.e. the swell 10 across the balls 6, before the rope is tightened by actuating the winch.

It may be pointed out that the hoisting devices, wether with one or two rows of balls, may be utilized with other carrier devices than the one specifically described herein by way of example. Thus, more particularly, said hoisting devices may be operated with carrier devices comprising automatic wedging means or manually controlled wedging blocks or the like, or alternatively with carrier devices of the type equipped with bearing arms with wedging screws. In all these cases, however, the use of a safety device is necessary.

In FIG. 5 there is shown diagrammatically the hoisting of a load 1 provided with standard suspension rings designated by the reference numerals 50 and 51, and the above-described hoisting device is operated by utilizing the tapped hole generally available on the load. The reference numeral 53 designates the aircraft structure, 54 being the carrier device and 55, 56 the conventional hooks interconnected by mechanisms of known type. The hoisting rope 9 passes over a pulley 57 and carries at its depending end the hoisting device illustrated in FIG. 1, adapted to co-act with the part 3 screwed in the load. By way of example, the reference numeral 58 designates a detachable winch aligned with the assembly and permitting of dispensing with any lateral access. This winch 58 may if desired be of the built-in type constantly incorporated in the aircraft structure.

In FIG. 6, the hoisting of a load 1 equipped with a pair of tandem-disposed bridge-type members 2 substituted for the rings of FIG. 1 is illustrated. Each one of the pair of corresponding ropes passes a pulley 57 and is wound on one of a pair of coaxial drums 59. The assembly of drums 59 is adapted to be driven by the winch proper, the latter being driven in turn by power means or simply manually. Besides, the drums may be so arranged that one drum can be shifted in relation to the other to compensate a non-simultaneous approach of the two hook means. This shifting may be obtained by using either a differential or a spring-loaded compensation bar, this last solution being acceptable considering the small differences likely to arise.

The hoisting and suspension device according to this invention is intended more particularly for hoisting loads on aircrafts, but it is clear that it may also be used for any other load handling operations.

Although specific forms of embodiment of this invention have been described hereinabove with reference to the accompanying drawings, it will readily occur to those skilled in the art that various modifications and changes may be brought thereto without departing from the scope of the invention as set forth in the appended claims.

What we claim is:

1. A rope hoisting device, for hoisting loads on aircraft, comprising:

(1) a pulley to be carried by an aircraft, (2) a hoisting rope running on said pulley and having a first end for connection to a winch, and a second end, (3) a swell member secured at said second end of the rope, said swell member including a portion of lesser cross-sectional area prolonged by a portion of greater cross-sectional area, (4) a socket within which said swell member is disposed and is longitudinally slidable, said socket including a portion of lesser cross-sectional area about said portion of the swell member of lesser cross-sectional area, said socket including a portion of greater cross-sectional area about said portion of the swell member of greater cross-sectional area, said portion of the socket of greater cross-sectional area including a plurality of radial apertures, (5) a plurality of balls disposed one in each aperture of the socket, said balls being adapted to assume a first position in which they project radially outwardly from their apertures when the portion of greater cross-sectional area of the swell member becomes positioned opposite said apertures and abuts against one end of the portion of the socket of lesser cross-sectional area, said balls being adapted to assume a second position in which they are retracted radially inwards in their apertures when the portion of lesser cross-sectional area of the swell member becomes positioned opposite to said apertures, (6) a connecting member adapted to be secured to the load, said member including a cylindrical recess to receive said socket, said member including in the wall of said cylindrical recess an internal peripheral groove adapted to receive said balls in their first position, tensioning of the rope with respect to said connecting member causing said swell member to move longitudinally in a first direction in said socket to cause said balls to assume their first position and lock the socket to the connecting member, and release of tension in the rope with respect to the connecting member permitting said swell member to move solely under gravity longitudinally in the opposite direction in said socket to permit movement of said balls to assume their second position and release the socket from the connecting member.

2. A rope hoisting device, as claimed in claim 1, further comprising a guide on said device within which said socket is longitudinally slidable, said guide having an internal circumferential recess, said socket having a second plurality of radial apertues each containing a respective ball of a second plurality of balls, and said swell member having a circumferential recess, the arrangement being such that when release of tension in the rope permits the swell member to move to release the socket from the connecting member, the circumferential recess of the swell member is not in alignment with the circumferential recess of the guide, and the socket is held by said second plurality of balls immovably with respect to the guide, whereas when tension is applied in the rope and the swell member is positioned such that the socket is locked to the connecting member, the circumferential recess of the swell member is aligned with the circumferential recess of the guide and the second plurality of balls no longer hold the socket immovable with respect to the guide.

3. A rope hoisting device, as claimed in claim 1, further comprising:

(1) a hook pivotably mounted in said device and positioned for engagement with said connecting member, (2) a rod coupled to said hook for movement of said hook to disengage said hook from said connecting member, (3) a two-arm lever pivotably mounted in said device and having a first arm coupled to said rod, and a second arm, (4) a detent heel pivotably mounted in said device and engaging with said second arm of said two-arm lever, (5) a manually operable member presenting a first end shaped as a nose and adapted to engage said detent heel, and a second end, (6) a stop member pivotably mounted in said device and presenting at one end an abutment portion and a notch, (7) means coupling said stop member and said swell member such that when said swell member has been moved in said first direction by tension in the rope, said stop member is pivoted to present said abutment portion to be abutted by said second end of said manually operable member, thereby to prevent manual rotation of said manually operable member and consequently to prevent releasing of said two-arm lever, whereby said rod and hook are prevented from movement to disengage the hook from the connecting member whilst the rope is under tension.

* * * * *